US008680708B2

(12) United States Patent
Shirai

(10) Patent No.: US 8,680,708 B2
(45) Date of Patent: Mar. 25, 2014

(54) ELECTRONIC APPARATUS

(75) Inventor: Tamotsu Shirai, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 266 days.

(21) Appl. No.: 13/243,067

(22) Filed: Sep. 23, 2011

(65) Prior Publication Data

US 2012/0074781 A1 Mar. 29, 2012

(30) Foreign Application Priority Data

Sep. 24, 2010 (JP) ................................. 2010-213535

(51) Int. Cl.
*H02J 3/14* (2006.01)

(52) U.S. Cl.
USPC ............. 307/38; 307/104; 307/112; 307/125; 307/18; 361/82; 361/18; 361/93.1; 361/93.9; 361/84; 315/308; 315/291; 315/246; 315/272; 315/307

(58) Field of Classification Search
USPC ............... 307/104, 125–127, 131, 80, 18, 38; 361/93.9, 93.1, 84, 82; 315/308, 291, 315/246
See application file for complete search history.

(56) References Cited

U.S. PATENT DOCUMENTS 4,667,289 A 5/1987 Yoshida et al.
6,256,182 B1 * 7/2001 Suzuki et al. ................ 361/93.9
6,278,598 B1 * 8/2001 Suzuki et al. ................ 361/93.9
7,358,625 B2 * 4/2008 Cheng et al. .................... 307/18
8,111,019 B2 * 2/2012 Kuo .............................. 315/308
8,314,513 B2 * 11/2012 Aoyama et al. ............... 307/104
2010/0306558 A1 12/2010 Kang

FOREIGN PATENT DOCUMENTS

EP 1 420 332 A2 5/2004
EP 1 420 332 A3 5/2004
EP 1 420 332 B1 5/2004
GB 2 107 105 A 4/1983

OTHER PUBLICATIONS

Albert (Jan. 4, 2004). "Automatic Shut Off Circuit," discussion on Electronic Points, located at http://www.electronicspoint.com/automatic-shut-off-circuit-t19916.html, last visited Nov. 21, 2012, five pages.
European Search Report mailed Nov. 29, 2012, for EP Patent Application No. 11182108.8, seven pages.

* cited by examiner

*Primary Examiner* — Rexford Barnie
*Assistant Examiner* — Jagdeep Dhillon
(74) *Attorney, Agent, or Firm* — Morrison & Foerster LLP

(57) ABSTRACT

In response to turning-on of a lock-type power switch, an initial controller outputs a first voltage for a first period and a gate is turned on for the period via a first driver responsive to the first voltage, then DC power is supplied to a main circuit. During the period, a control processor causes a voltage output section to start outputting a second voltage so that the gate is turned on via a second driver to continue the DC power supply. When no event has been generated for a second period, the second voltage from the voltage output section is stopped to turn off the gate, thus the power supply to the main circuit is shut off. Once a power from outside is switched from OFF to ON while the power switch kept ON, the power supply to the main circuit is resumed via the controller and first driver.

4 Claims, 4 Drawing Sheets

ELECTRONIC APPARATUS

BACKGROUND

The present invention relates to apparatus provided with an electric power supply control means for controlling electric power supply to a main control section.

In the field of electronic musical instruments that are a form of electronic apparatus, it has heretofore been known to turn on or off electric power supply in response to user's operation of a power supply switch, to automatically turn off the electric power supply under control of a CPU if there has been no performance event for a predetermined time period, and to turn off the electric power supply at appropriate timing within a process following operation of the power supply switch. Examples of such electronic musical instruments are disclosed in Japanese Patent Nos. 2692400 and 2847996 (hereinafter referred to as "patent literature 1" and "patent literature 2", respectively).

Further, in the case where ON/OFF of the electric power supply is controlled not only in response to user's operation of the power supply switch but also by the CPU as disclosed in patent literature 1 and patent literature 2, it has been conventional to construct the power supply switch by use of a momentary switch, supply electric power to main equipment component parts, including the CPU, via gates in the form of transistors and relays, and control opening/closing (ON/OFF) in accordance with detection of operation of the power supply switch and control by the CPU.

However, in the case where a momentary switch is employed as the power supply switch as disclosed in patent literature 1 and patent literature 2, even when the electric power supply to the apparatus is OFF, it is necessary to keep supplying electric power to circuitry that is provided for detecting operation of the switch and controlling the gates in response to the detection of the switch operation, and thus, a certain amount of standby electric power consumption would occur. But, such standby electric power consumption is not preferable nowadays when reduction of electric power consumption are being strongly called for.

Heretofore, there has also been a demand that individual power supplies to desired ones of a plurality of apparatus connected to a multi-socket power strip be turned on or off collectively by means of a power supply switch provided on the power strip. Such a demand is strongly felt particularly in electronic musical instruments and audio equipment where a combination of apparatus to be used is frequently changed according to the situation.

For example, in cases where a plurality of keyboards are disposed and used in an overlapping arrangement and pluralities of tone generators, effecters, mixers, etc. are used placed in a rack, the numbers of the keyboards and tone generators to be powered on vary in accordance with the number of performance parts to be simultaneously played, and, in these cases, only each effecter to be used has to be powered on and each effecter not to be used may be powered off. Further, if no audio signal mixing is required, the mixers need not be powered on. Namely, a combination of apparatus to be simultaneously powered on frequently changes according to the situation. Thus, if the same operations as those having been performed till immediately before the change are to be performed again, there arises a demand to simultaneously power on the same apparatus as those having been ON till immediately before the change; because, if the same apparatus can be simultaneously powered on, the time and labor necessary for powering on the apparatus can be significantly reduced.

However, with the conventionally-known electronic musical instruments or electronic apparatus using the momentary switch, merely operating the switch of the power strip provided externally to the apparatus cannot start electric power supply or feeding to main equipment component parts, although it can stop the electric power feeding. Such a disadvantage would also be encountered in electronic apparatus other than audio signal processing apparatus.

SUMMARY OF THE INVENTION

In view of the foregoing prior art problems, it is an object of the present invention to provide an improved electronic apparatus of the type which switches between ON and OFF states of electric power supply to a main circuit section in response to operation of a power supply switch, and which can not only reduce standby electric power consumption but also trigger or start electric power feeding to the main circuit section in response to connection to an external power source while permitting an automatic stop of electric power feeding under control of the main circuit section.

In order to achieve the above-mentioned object, the present invention provides an improved electronic apparatus, which comprises: a main circuit section (3; 204) including a control processor (41; 205) that controls operation of the electronic apparatus in response to various events, and a voltage output section (50; 206) that outputs a second voltage under control of the control processor; a power line (11*a*; 202*a*) to which is supplied DC electric power from outside said electronic apparatus; a gate (13, 14, 15; 203) which supplies the DC electric power from said power line to the main circuit section during the gate is turned on, and stops supplying the DC electric power to said main circuit during the gate is turned off; a lock-type power switch (18, 22; 108) of which a position of a mechanical member toggles between an ON position and OFF position in response to user's operation thereof, and the ON or OFF position of the mechanical member being mechanically retained; an initial controller (19, 20, 21, 23, 26, 27; 207) to which the DC electric power is supplied from the power line through the lock-type power switch during the mechanical member is in the ON position, the initial controller outputting a first voltage for a first predetermined period just after the supply of the DC electric power to the initial controller starts; a first driver (16, 24, 25; 209) which turns on the gate during the initial controller outputs the first voltage; and a second driver (17, 29, 30; 210) which turns on the gate during the voltage output section outputs the second voltage. In the electronic apparatus of the present invention, the gate (13, 14, 15; 203) is turned off during none of the first driver and the second driver turns on said gate. Also, in the electronic apparatus of the present invention, the lock-type power switch (18, 22; 108) enables the first driver and the second driver during said mechanical member is in the ON position, and disables the first driver and the second driver to turn off the gate during the mechanical member is in the OFF position. Further, in the electronic apparatus of the present invention, the control processor (41; 205) is adapted to: within the first predetermined period just after the gate starts supplying the DC electric power to the main control section, control (S11) the voltage output section to start outputting the second voltage; and when no event has been detected for a second predetermined period by the control processor, control (S25) the voltage output section to stop outputting the second voltage, to thereby turn off the gate. Note that the numbers in the parentheses as indicated above correspond to reference numbers employed in the embodiments of the present invention described hereinafter, and they are indicated only for reference.

According to the present invention, in response to turning-on of the lock-type power switch, the initial controller outputs the first voltage for the first predetermined period and the gate is turned on for the first predetermined period via the first driver responsive to the first voltage, so that DC electric power is supplied to the main circuit section. During the first predetermined period, the control processor causes the voltage output section to start outputting the second voltage so that the gate is turned on via the second driver, and the DC electric power supply to the main circuit section continues. Once the lock-type power switch is turned off, the first and second drivers are disabled to turn off the gate, so that the DC electric power supply to the main circuit section is shut off. In this way, ON/OFF control of the DC electric power supply to the main circuit section can be performed in accordance with the ON or OFF state of the power switch. When no event has been generated for the second predetermined period, the second voltage output from the voltage output section is stopped to turn off the gate, so that the DC electric power supply to the main circuit section is shut off. In this way, the electric power supply can be automatically shut off in accordance with a status of use of the main circuit section, and thus, standby electric power consumption can be reduced. In this case, the electric power supply or feeding to the main circuit section can be resumed manually by switching the lock-type power switch from the ON state to the OFF state and then from the OFF state to the ON state. Once the DC electric power supply from outside over the power line is switched from the OFF state to the ON state while the DC electric power supply to the main circuit section is shut off with the lock-type power switch kept ON, the DC electric power is input from the power line to the initial controller via the lock-type power switch set in the ON state, so that the gate is turned on for the first predetermined period via the first driver and thus the electric power supply to the main circuit section can be automatically resumed via the first driver. Namely, the electric power supply or feeding to the main circuit section can be automatically resumed in response to (i.e., by being triggered by) connection to an external power source.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
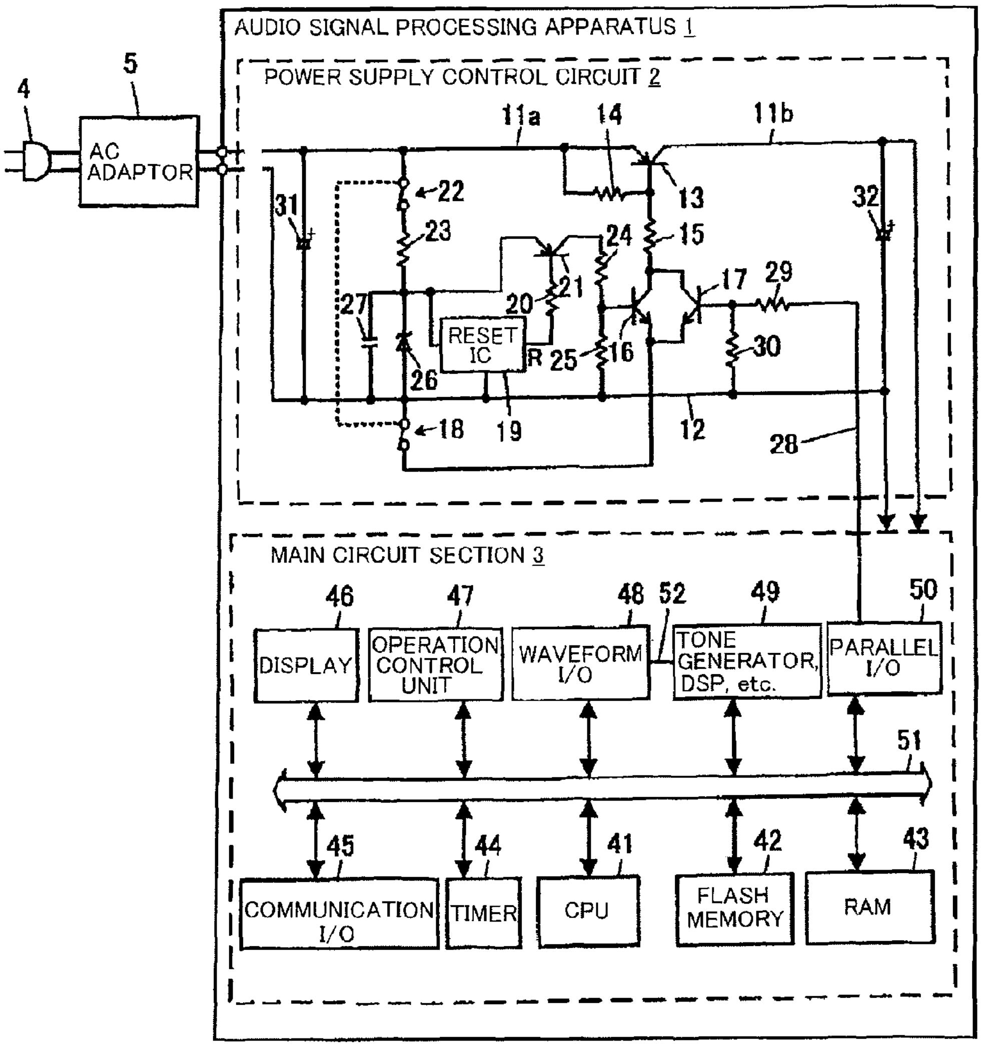
FIG. 1 is a block diagram showing a construction of an audio signal processing apparatus that is an embodiment of an electronic apparatus of the present invention.

FIG. 1 is a block diagram showing a construction of an audio signal processing apparatus that is an embodiment of an electronic apparatus of the present invention. As shown in FIG. 1, the audio signal processing apparatus 1, which is an embodiment of the electronic apparatus of the present invention, includes a power supply control circuit 2 and a main circuit section 3. Further, in the audio signal processing apparatus 1, a power plug 4 is connected to a commercial power source (not shown), and AC electric power supplied via the power plug 4 is converted via an AC adaptor 5 into DC electric power that is then supplied from the commercial power source to the main circuit section 3 to operate the main circuit section 3. The power supply control circuit 2 is a power supply control means that switches between ON and OFF of electric power supply to the main circuit section 3 in response to user's operation of a lock-type power supply switch and control by a CPU 41 provided in the main circuit section 3.

The main circuit section 3, which is hardware for implementing an audio signal processing function in the audio signal processing apparatus 1, is constructed by interconnecting the CPU 41, flash memory 42, RAM 43, timer 44, communication I/O (input/output section) 45, display device 46, operation control unit 47, waveform I/O 48, tone generator, DSP, etc. 49 and parallel I/O 50 via a system bus 51 and audio bus 52. By executing programs stored in the flash memory 42, the CPU 41 controls operation of various components to implement an audio signal processing function of at least one of an electronic musical instrument, synthesizer, digital mixer, effecter, amplifier, powered speaker, etc.

Note that a detailed description about behavior of the main circuit section 3 will be omitted here because the main circuit section 3 may comprise conventionally-known components except for the parallel I/O 50 and components pertaining to control of output of the parallel I/O 50.

Further, because the audio signal processing apparatus 1 is characterized by a construction of the power supply control circuit 2 and behavior of the parallel I/O 50 responsive to control by the CPU 41, the following mainly describe such a construction of the power supply control circuit 2 and behavior of the parallel I/O 50. Note that the CPU 41 and the parallel I/O 50 together constitute a main control section.

The power supply control circuit 2 includes a power line 11 (11*a* represents an upstream-side power line while 11*b* represents a downstream-side power line) to which is input electric power converted into DC electric power via an AC adaptor 5. Reference numeral 12 represents a ground line paired with the above-mentioned power line 11.

A gate transistor 13 in the form of a PNP-type power transistor is provided between the upstream-side power line 11*a* and the downstream-side power line 11*b*, as a power supply gate for switching between ON and OFF states of electric power supply to the main circuit section 3. A voltage of (i.e., across) the base of the gate transistor 13 is lower than a voltage of the power line 11*a* obtained by dividing the voltage of the power line 11*a* by means of resistors 14 and 15 and coupled to the emitter of the gate transistor 13. Note, however, that the voltage is input to the gate transistor 13 only when not only at least one of a first gate control transistor 16 and second gate control transistor 17 is in a conducting or ON state but also a power switch 18 of the lock-type power supply switch is also in the conducting or ON state.

Thus, if the above-mentioned condition is satisfied, the gate transistor 13 turns on to effect electric power supply to the main circuit section 3, but, if not, the gate transistor 13 turns off (i.e., turns to the non-conducting state) so that the electric power supply to the main circuit section 3 is shut off.

Therefore, the ON/OFF of the electric power supply to the main circuit section 3 can be controlled by the ON/OFF operation of the first gate control transistor 16, second gate control transistor 17 and power switch 18.

Of these, the ON/OFF of the first gate control transistor 16 is controlled by a reset IC 19. Once electric power supply to the reset IC 19 is started and reaches a predetermined voltage level, such as 4 V (volts), the reset IC 19 outputs a low-level signal (control signal or first predetermined voltage) to a reset output R. At that time, the reset IC 19 causes an internal timer to start counting time, and once a predetermined time period (first time period), e.g. in a range of 200 to 400 msec., elapses, the reset IC 19 sets the reset output R at high impedance (that may be a high-level signal). When there is no electric power supply, the reset output R is at high impedance.

In the power supply control circuit 2, the reset output R of the reset IC 19 is connected to the base of a PNP-type transistor 21 via a resistor 20. Once a power switch 22 of the lock-type power supply switch is turned on, electric power is supplied over the power line 11 to the reset IC 19 via a resistor 23, and a voltage is also applied to the emitter of the transistor 21.

Once the reset IC 19 outputs the low-level signal to the reset output R in such a state, a voltage of the base of the transistor 21 becomes lower than a voltage of the emitter of the transistor 21, so that the transistor 21 turns on. Thus, the voltage of the emitter of the transistor 21 is divided by resistors 24 and 25 and the resultant divided voltage is supplied to the base of the NPN-type first gate control transistor 16, so that the first gate control transistor 16 turns on. In this state, the gate transistor 13 too turns on on condition that the power switch 18 is ON.

In this case, the voltage of the emitter of the transistor 21 is the above-mentioned first predetermined voltage. Further, because, in this case, the power switch 22 is ON and thus electric power is being supplied to a zener diode 26, the voltage of the emitter of the transistor 21 becomes a zener voltage of the diode 26. A capacitor 27 is connected in parallel to the zener diode 26 so that its cathode-side voltage does not vary rapidly.

Once the first predetermined time period elapses after the power switch 22 turns on, the reset output R of the reset IC 19 assumes high impedance, so that the transistor 21 turns off. Thus, the base of the first gate control transistor 16 too assumes high impedance, so that the gate control transistor 16 turns off. The same occurs when no electric power is being supplied to the reset IC 19, or when the reset output R of the reset IC 19 is at a high level. In such a state (i.e., unless the second gate control transistor 17 is ON), the gate transistor 13 too is OFF.

Therefore, the reset IC 19 constitutes an initial control circuit which, once electric power supply over the upstream-side power line 11*a* is started, causes the first gate control transistor 16 to turn on the gate transistor 13 for the first predetermined time period, and the reset IC 19, first gate control transistor 16 and circuits pertaining to these reset IC 19 and first gate control transistor 16 together constitute a first gate control means.

Note that the zener diode 26 is provided for preventing a contingent or unexpected high voltage from being applied to the reset IC 19 due to noise etc., and that the capacitor 27 is provided for preventing an AC component from being applied to the reset IC 19.

ON/OFF of the second gate control transistor 17, on the other hand, is controlled by a control signal supplied from the parallel I/O 50 over a signal line 28. The control signal is divided by resistors 29 and 30 and the resultant divided voltage is supplied to the base of the NPN-type second gate control transistor 17. The parallel I/O 50 functions as a voltage output section that outputs a second predetermined voltage.

While (i.e., as long as) the above-mentioned control signal is at a high level (control voltage or second predetermined voltage), the second gate control transistor 17 is turned on, in which state the gate transistor 13 too is turned on provided that the power switch 18 is ON. Further, while (i.e., as long as) the above-mentioned control signal is at a low level or high impedance level, the second gate control transistor 17 is turned off, so that the gate transistor 13 too is turned off unless the first gate control transistor 16 is ON.

The second gate control transistor 17 is a second driver that controls the ON/OFF state of the gate transistor 13 in accordance with a signal supplied from the main control section.

Further, reference numerals 31 and 32 represent large-capacity electrolyte capacitors for stabilizing the voltage of the electric power supplied from the AC adaptor 5.

Figures 2A, 2B:
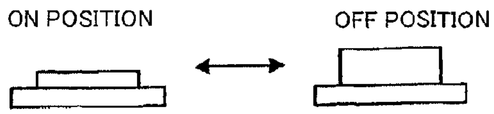
FIGS. 2A and 2B are views explanatory of an operation section of a power supply switch provided in the audio signal processing apparatus shown in FIG. 1.

Furthermore, in the power supply control circuit 2, the first power switch 22 and second power switch 18 are constructed as lock-type switches of two circuits and four terminals which operate in interlocked relation to each other. FIGS. 2A and 2B show an outer appearance and behavior of an operation section of the power switches 18 and 22; more specifically, FIG. 2A shows an ON state of the operation section, while FIG. 2B shows an OFF state of the operation section of the power switches.

In the audio signal processing apparatus 1, as seen from the figures, the power supply switches 18 and 22 are constructed as switches that have a single push button as their common operation section operable by the user and that are constructed as switches sequentially switchable between ON and OFF states in a toggle-like fashion in response to operation of the push button. Because the power supply switches 18 and 22 are of the lock type, the operation section is maintained in a position corresponding to the ON or OFF state of the power supply switches 18 and 22 (i.e., in a depressed position when the power supply switches 18 and 22 are in the ON state, or in a non-depressed or released position when the power supply switches 18 and 22 are in the OFF state) even when a user releases its hand or finger from the operation section. Thus, the ON/OFF state of the power supply switches 18 and 22 is identifiable at first glance.

Thus, the ON/OFF state of the two power supply switches 18 and 22 shown in FIG. 1 can be switched to the other state simultaneously or in interlocked relation to each other though operation of the single button shown in FIG. 2. Namely, when the operation section is in the depressed position or ON state, the two power supply switches 18 and 22 are each closed to be in the conducting or ON state, while, when the operation section is in the released position or OFF state, the two power supply switches 18 and 22 are each opened to be in the non-conducting or OFF state. In FIG. 1, a broken line interconnecting these power supply switches 18 and 22 indicates the interlocking between the switches 18 and 22.

The following describe behavior of the power supply control circuit 2 responsive to the ON/OFF of the power supply switches 18 and 22.

When the power supply switches 18 and 22 are in the OFF state, the reset IC 19 is shut off from the power line 11 so that no electric power is supplied thereto, and thus, the first gate control transistor 16 is never placed in the ON state. In this state, no electric power is being supplied to the emitter of the transistor 21, and thus, even in case the transistor 21 turns on, no electric power flows through the resistors 24 and 25, so that a voltage drop enough to turn on the transistor 16 never occurs in the resistor 25.

Further, when the power switch 18 is in the OFF state, the emitters of the first gate control transistor 16 and second gate control transistor 17 are in a floating state, and thus, there is no possibility of the first gate control transistor 16 and second gate control transistor 17 turning on. Even in case any one of the first gate control transistor 16 and second gate control transistor 17 turns on, no electric current flows to the resistor 15. If no electric current flows to the resistor 15 like this, a voltage drop enough to turn on the transistor 13 never occurs in the resistor 14, and thus, the transistor 13 never turns on.

Because the function of the first gate control transistor 16 is in a substantively disabled state as noted above, and because no electric power is being supplied to the initial control circuit, and thus, it is possible to even further reduce electric power leakage during the time electric power supply or feeding to the power line 11 is OFF.

When the power supply switches 18 and 22 have been turned on while electric power is being fed to the power line 11, or when electric power has been fed to the power line 11 while the power supply switches 18 and 22 are in the ON state (e.g., when the power plug 4 has been connected to a socket of the commercial power source with the AC adaptor 5 connected to the audio signal processing apparatus 1, or when the AC adaptor 5 has been connected to the audio signal processing apparatus 1 with the power plug 4 connected to the socket of the commercial power source), electric power supply to the reset IC 19 is started so that the first gate control transistor 16 is turned on for the first predetermined time period as noted above, in response to which the gate transistor 13 too turns on and thus electric power is supplied to the main circuit section 3.

Then, when the CPU 41 is reset by a not-shown reset circuit and performs an initialization process in response to the start of the electric power supply to the main circuit section 3, it sets the parallel I/O 50 to output a high-level signal to the signal line 28. Once the parallel I/O 50 outputs the high-level signal to the signal line 28 in response to the setting by the CPU 41, the second gate control transistor 17 can be turned on. In the instant embodiment, arrangements are made such that operations can be performed within the first predetermined time period following the start of the electric power supply (i.e., after the time point when the electric power supply has been started), i.e. before the first gate control transistor 16 returns to the OFF state.

Then, even after the first gate control transistor 16 turns off following the lapse of the first predetermined time period, the gate transistor 13 can be turned on via the second gate control transistor 17, so that the electric power supply to the main circuit section 3 can continue as long as the parallel I/O 50 outputs the high-level signal to the signal line 28.

However, once the power switch 18 is turned off, the gate transistor 13 turns off irrespective of a current state of the second gate control transistor 17, so that the electric power supply to the main circuit section 3 is terminated. Namely, the function of the second gate control transistor 17 is placed in a substantively disabled state.

Further, once the CPU 41 detects that there has been no user's operation for a predetermined time period, it automatically stops the electric power supply to the main circuit section 3 ("auto powering-off"). In this case, if the CPU 4 sets the output from the parallel I/O 50 to the signal line 28 at a lower level or high impedance, both of the first and second gate control transistors 16 and 17 are turned off. Thus, even when the power switch 18 is ON, the gate transistor 13 turns off, so that the electric power supply to the main circuit section 3 is terminated.

Further, once the power supply switches 18 and 22 are switched from the ON state to the OFF state while electric power is being fed to the upstream-side (i.e., AC-adaptor-side) power line 11*a*, the electric power supply from the power line 11*a* to the main circuit 3 is terminated through the operation of the power switch 18.

The power switch 22, which is provided for starting electric power supply to the initial control circuit in response to user's turning-on operation of the power supply switch, also functions to prevent (nominal) electric power from being consumed in the initial control circuit during the OFF state of the power supply switch. However, the power switch 22 in effect seldom gets involved in the operation for turning of the gate transistor 13.

Even after the electric power supply to the main circuit section 3 has been terminated in the aforementioned manner, the low-level signal would not be output from the reset IC 19 because the electric power supply to the reset IC 19 is still continuing. Thus, even if the electric power supply to the main circuit section 3 is terminated, the first gate control transistor 16 would never turn on. If the electric power supply to the main circuit 3 is to be resumed in this state, there is a need to temporarily turn off and then again turn on the power supply switches 18 and 22, or temporarily terminate DC electric power supply from the AC adaptor 5 to the audio signal processing apparatus 1 and then resume the DC electric power supply to the audio signal processing apparatus 1.

Specifically, such termination of the DC electric power supply from the AC adaptor 5 to the audio signal processing apparatus 1 is effected in any one of the following ways: pulling out and then again inserting the consent plug of the AC adaptor 5 and then again inserting the same; temporarily turning off and again turning on the switch of the power strip having the AC adaptor 5 connected thereto; and pulling out the AC adaptor 5 from the audio signal processing apparatus 1 and then again inserting the plug of the AC adaptor 5 into the audio signal processing apparatus 1.

The following describe various processing performed by the CPU 41, focusing mainly on control of the second data control transistor 17 performed via the above-mentioned parallel I/O 50.

Figure 3:
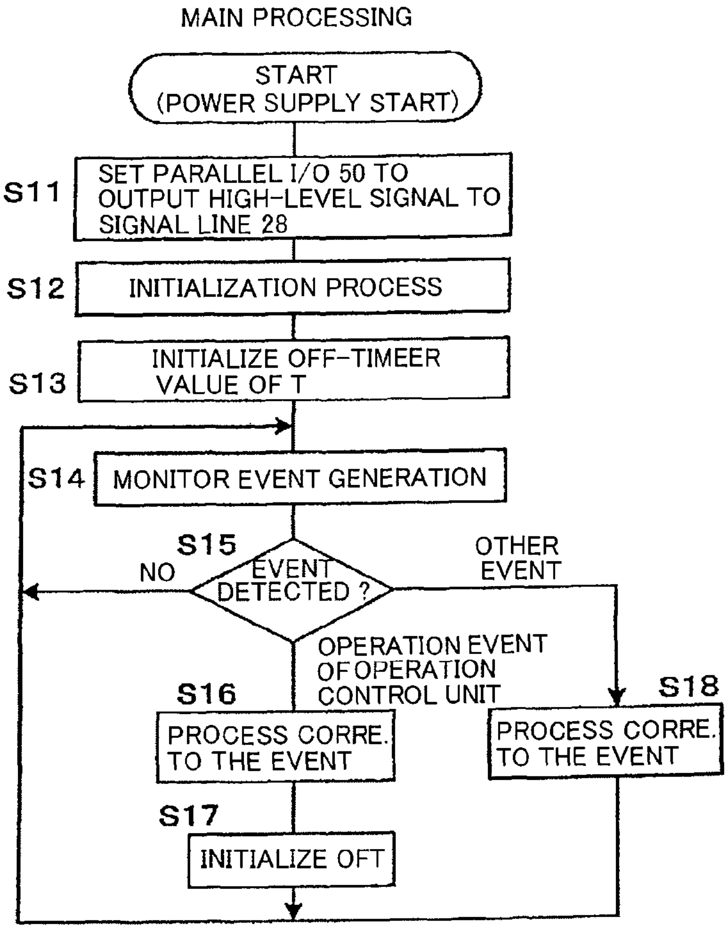
FIG. 3 is a flow chart of main processing performed by a CPU in the audio signal processing apparatus shown in FIG. 1.

FIG. 3 shows a flow chart of main processing performed by the CPU 41 in response to the start of the electric power supply. Namely, in response to the start of the electric power supply to the main circuit section 3, the CPU 41 is reset by the not-shown reset circuit to start the processing flowcharted in FIG. 3.

First, at step S11, the CPU 41 sets the parallel I/O 50 to output a high-level signal to the signal line 28. Then, the CPU 41 performs a given initialization process at step S12 and sets, at step S13, a predetermined value into a register OFT that stores an off-timer value. The predetermined value to be set here is a value representing a predetermined time period (second predetermined time period) such that the electric power supply to the main circuit section 3 is terminated if there has been no operation for that predetermined time period (second time period). Further, in the following description, the value stored in the register OFT will hereinafter be referred to as "off-timer value OFT".

Regular operations are performed at and after step S14, where occurrence or generation of various events in the audio signal processing apparatus 1 is monitored at step S14, and if any event is detected at step S15, a process corresponding to the detected event is performed at step S16 or S18. More specifically, if the detected event is an operation event of the operation control unit, then the above-mentioned predetermined value is set again into the register OFT at step S17, and the time count having been counted till termination of the electric power supply to the main circuit section 3 is reset.

As long as the electric power is supplied to the main circuit section 3, the CPU 41 continues performing the aforementioned operations to thereby control behavior of the individual components of the main circuit section 3 in accordance with operation by the user, signals from external apparatus, etc., to thereby realize functions as the audio signal processing apparatus.

Figure 4:
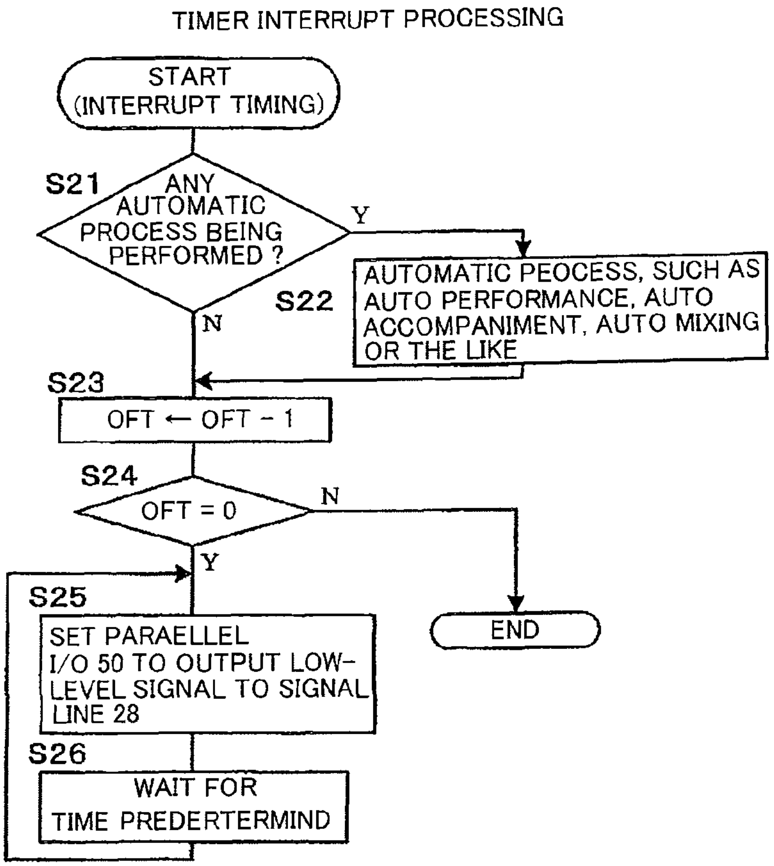
FIG. 4 is a flow chart of timer interrupt processing performed by the CPU in the audio signal processing apparatus shown in FIG. 1.

FIG. 4 shows a flow chart of timer interrupt processing performed by the CPU 41 in response to a timer interrupt signal generated per predetermined time period. In order to perform predetermined automatic processing on a periodical basis irrespective of presence/absence of an event, the CPU 41 sets periodic interrupt timing based on time counting by the timer 44. In this way, the CPU 41 starts the timer interrupt processing of FIG. 4 at each of the interrupt timing.

Then, in the timer interrupt processing of FIG. 4, a determination is made, at step S21, as to whether any automatic process, such as an automatic performance, automatic accompaniment, automatic mixing or the like, is being performed. If answered in the affirmative at step S21, that automatic performance is performed at step S22.

After that, the register OFT is decrement by one at step S23. Then, if the value of the register OFT has not yet reached a value "0" as determined at step S24, the timer interrupt processing is brought to an end without performing any other operation. If, on the other hand, the register OFT has reached the value "0" as determined at step S24, it means that there has been no operation event in the operation control unit for the second predetermined time period, and thus, the CPU 41 sets the parallel I/O 50 to output a low-level signal to the signal line 28, at step S25. Thus, the electric power supply to the main circuit section 3 is terminated (auto powering-off), so that the CPU 41 stops its operation. In case the electric power supply to the main circuit section 3 is not properly terminated for some certain reason, the CPU 41 again sets the parallel I/O 50 to output the low-level signal after waiting for a predetermined time, at step S26.

By the CPU 41 performing the processing of FIGS. 3 and 4, it is possible to not only maintain the electric power supply to the main circuit section 3 but also effect termination of the electric power supply to the main circuit section 3 when there has been no operation in the operation control unit for the second predetermined time period. With the aforementioned arrangements, the audio signal processing apparatus 1 can achieve the following advantageous benefits.

First, because no circuit operates for detecting a state of the operation section of the power supply switch when no electric power is being supplied to the main circuit section 3, electric power consumption in that state can be highly minimized. When the electric power supply to the main circuit section 3 has been terminated due to the auto powering-off, the electric power remains supplied to the initial control circuit, but the power consumption in the initial control circuit is extremely small in amount. When the electric power supply to the main circuit section 3 has been terminated due to turning-off of the power supply switch, however, the electric power feeding to the initial control circuit too is terminated, so that the power consumption can be even further minimized.

Further, while the power switches 18 and 22 are ON, the electric power supply to the main circuit section 3 can be triggered or started in response the start of the electric power supply to the power line 11. Thus, supply of the DC electric power to the main circuit section 3 can be started by starting supply of the DC electric power to the upstream-side power line 11*a*, for example, in response to turning-on operation of some switch provided externally to the audio signal processing apparatus 1.

Figure 5:
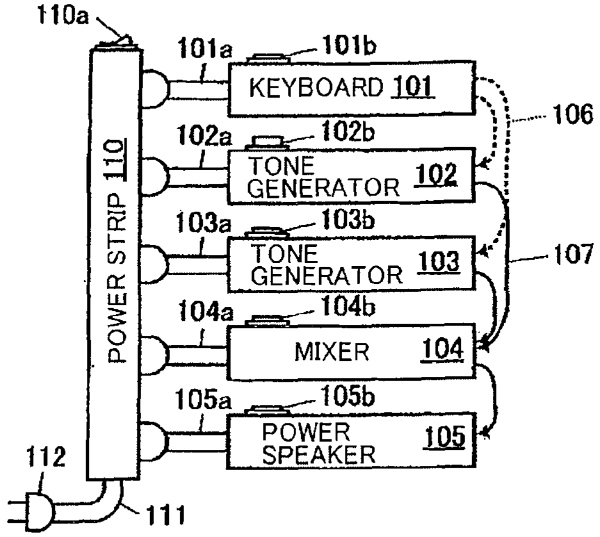
FIG. 5 is a block diagram showing example usage of the audio signal processing apparatus.

For example, let's assume a case where a plurality of audio signal processing apparatus constructed based on the basic principles of the present invention, such as a keyboard 101, tone generators 102 and 103, mixer 104 and power speaker 105, are connected to a single or common power strip 110 via power cables 101*a* to 105*a*, each having an AC adaptor (not shown), and are used by being connected via a MIDI cable 106 and audio cable 107, as shown in FIG. 5. In this case, the power strip 110 is connected to the commercial power source via a power cable 111 and power supply plug 112.

Then, by operating a power supply switch 110*a* provided on the power strip 110 to collectively turn on individual sockets of the power strip 110, supply of DC electric power to the power lines 11*a* of the individual audio signal processing apparatus can be collectively started.

In each of the plurality of audio signal processing apparatus whose power switch 101*b*-105*b* (corresponding to the power switches 18 and 22) is turned on, the electric power supply is started over the power line 11*a* to the main circuit section 3 via the gate transistor 13 and power line 11*b*. Namely, whether or not the electric power supply to the main circuit section 3 in any of the audio signal processing apparatus is started in response to turning-on operation of the power supply switch 110*a* depends on whether the operation section of the lock-type power switch 101*b*-105*b* of the audio signal processing apparatus is in the ON state or in the OFF state, and can be readily visually recognizable by the user. Further, the ON/OFF state of each of the lock-type power switches 101*b*-105*b* is changeable by the user irrespective of whether the DC electric power is being supplied to the power line 11*a*. Thus, even when the power supply switch 110*a* is in the OFF state, the user can set, as desired, of which one of the plurality of audio signal processing apparatus the electric power is to be supplied to the main circuit section 3, next time the power supply switch 110*a* is turned on.

Further, when the lock-type power switch is in the OFF state, the driver is brought to the disabled state by the switch 18, and the gate transistor 13 is turned off compulsorily, as set forth above. Thus, there is no possibility of the data transistor 13 being erroneously turned on due to pulse-like noise, logical bug, program log and/or the like.

Furthermore, the CPU 41 only has to perform a simple operation for turning on the gate transistor 13 at the time of the start of the electric power supply from the power line 11*a* to the main circuit section 3, and the CPU 41 only has to perform a simple operation for turning off the gate transistor 13 at the time of the auto powering-off. Thus, in this case where the ON/OFF of the electric power supply from the power line 11*a* to the main circuit section 3 can be controlled in a stable manner, as compared to a case where an operation or circuit is included for alternately switching between the ON and OFF states of the gate transistor 13 in a flip-flop-like fashion.

Figure 6:
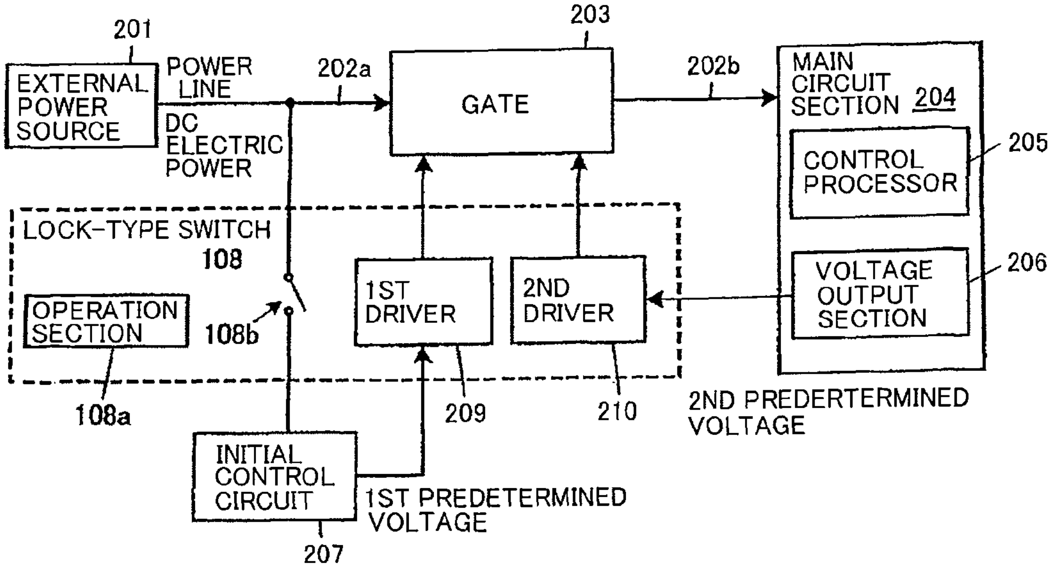
FIG. 6 is a functional block diagram of a power supply control circuit in a modification of the audio signal processing apparatus.

[Modification of FIG. 6]

Whereas the foregoing has described the preferred embodiment of the present invention, it should be appreciated that the specific circuit construction, content of the processing, scheme of the electric power feeding from the outside, etc are of course not limited to those described above in relation to the preferred embodiment of the present invention. For example, the specific circuit construction of the power supply control circuit 2 may be any desired one as long as it has functional arrangements shown in a functional block diagram shown in FIG. 6, Namely, the specific construction of the power supply control circuit 2 in a modification of the present invention may be any desired one as long as it comprises: a main control section 204 including a control processor 205 and a voltage output section 206 capable of outputting the second predetermined voltage; a power line 202*a* to which is supplied DC electric power from an external power source 201; a gate 203 that blocks the DC electric power supply to the main control section 204 via the power line 202*a* and power line 202*b*; an initial control circuit 207 that outputs the first predetermined voltage for a first predetermined time period following the start of the DC electric power supply (i.e., after the time point when the DC electric power supply has been started); a first driver 209 that cancels the blocking, by the gate 203, while the first predetermined voltage is being supplied from the initial control circuit 207; a second driver 210 that cancels the blocking, by the gate 203, while the second predetermined voltage is being supplied from the voltage output section 206; and a lock-type switch 108 capable of being turned on or off in response to user's operation of an operation section 108*a*. The control processor 205 sets the voltage output section 206 to output the second predetermined voltage within the first predetermined time period following the start of the DC electric power supply (i.e., after the time point when the DC electric power supply has been started). Further, when a predetermined event has not been detected for a second predetermined time period, the control processor 205 sets the voltage output section 206 to stop outputting the second predetermined voltage. When the operation section 108*a* is in an OFF position, the lock-type switch 108 not only disconnects the power line 202*a* and the initial control circuit 207 by means of a switching section 108*b*, but also disables the first and second drivers 209 and 210 by means of a switching unit indicated by a broken-line rectangular frame in FIG. 6. When the operation section 108*a* is in an ON position, the lock-type switch 108 not only connects the power line 202*a* and the initial control circuit 207 to supply the DC electric power from the power line 202*a* to the initial control circuit 207, but also enables the first and second drivers 209 and 210.

Further, a gate transistor that is a primary circuit element for realizing the function as the gate 103 may be a voltage-driven type insulating gate bipolar transistor or power MOS-FET (Metal-Oxide-Semiconductor Field-Effect Transistor), or a current-driven type bipolar transistor.

Whereas the illustrated example of FIG. 1 has been described above in relation to the case where the reset IC 19 is employed as a main circuit element in the initial control circuit, the reset IC 19 may be replaced with a discrete circuit element.

Further, in the illustrated example of FIG. 1, the first predetermined voltage only has to be high enough to turn on the first gate control transistor 16 when the power switch 18 is ON, and the first predetermined voltage may be a voltage that varies in some degree. Similarly, the second predetermined voltage only has to be high enough to turn on the second gate control transistor 17 when the power switch 18 is ON, and the second predetermined voltage may be a voltage that varies in some degree.

Furthermore, what supplies the DC electric power from the outside need not necessarily be the AC adaptor 5 and may be any one of various types of electric cells and batteries, DC-DC converter, or the like.

Furthermore, the CPU 41 may be constructed to initialize the value of the register OFT in response to generation of a particular event other than an operation event of the operation control unit.

Furthermore, even when a YES determination has been made at step S24 of FIG. 4, the electric power supply may be maintained until some condition is met, e.g. until automatic processing arrives at an appropriate breakpoint.

Furthermore, the lock-type switch need not necessarily be a push-pull switch that performs alternate switching operation and may be a seesaw-type switch, sliding-type switch, toggle switch, rotary switch or the like. Namely, the lock-type switch only has to be a switch that is maintained in the ON or OFF position set in response to user's operation, and the lock-type switch may be of any desired shape.

Furthermore, whereas the embodiment of the present invention has been described above as applied to an audio signal processing apparatus, it should be appreciated that the present invention is also applicable to various desired electronic apparatus, such as computers, displays, measurement apparatus and monitoring apparatus.

Moreover, the above-described embodiment and modifications may be employed in any desired combinations as long as the combinations are appropriate.

As apparent from the foregoing, the electronic apparatus of the present invention, which switches between the ON and OFF states of the electric power supply to the main control section in response to operation of the power supply switch, can not only reduce standby electric power consumption but also trigger or start the electric power feeding to the main circuit section in response to connection to the external power source while permitting an automatic stop of the electric power feeding under the control of the main circuit section. Thus, the basic principles of the present invention can provide an electronic apparatus in which standby electric power consumption can be minimized and which can achieve enhanced convenience.

The present application is based on, and claims priority to, Japanese Patent Application No. 2010-213535 filed on Sep. 24, 2010. The disclosure of the priority application, in its entirety, including the drawings, claims, and the specification thereof, is incorporated herein by reference.

What is claimed is:

1. An electronic apparatus comprising:

a main circuit section including a control processor that controls operation of the electronic apparatus in response to various events, and a voltage output section that outputs a second voltage under control of said control processor;

a power line to which is supplied DC electric power from outside said electronic apparatus;

a gate which supplies the DC electric power from said power line to said main circuit section while said gate is turned on, and stops supplying the DC electric power to said main circuit section while said gate is turned off;

a lock-type power switch of which a position of a mechanical member toggles between an ON position and OFF position in response to user's operation thereof, and the ON or OFF position of the mechanical member being mechanically retained;

an initial controller to which the DC electric power is supplied from said power line through said lock-type power switch while said mechanical member is in the ON position, said initial controller outputting a first voltage for a first predetermined period just after the supply of the DC electric power to said initial controller starts;

a first driver which turns on said gate while said initial controller outputs the first voltage; and a second driver which turns on said gate while said voltage output section outputs the second voltage, wherein said gate is turned off while none of said first driver and said second driver turns on said gate, wherein said lock-type power switch enables said first driver and said second driver while said mechanical member is in the ON position, and disables said first driver and said second driver to turn off the gate while said mechanical member is in the OFF position, and wherein said control processor is adapted to:

within said first predetermined period just after said gate starts supplying the DC electric power to said main circuit section, control said voltage output section to start outputting the second voltage; and when no event has been detected for a second predetermined period by said control processor, control said voltage output section to stop outputting the second voltage, to thereby turn off said gate.

2. The electronic apparatus as claimed in claim 1, wherein said lock-type power switch further includes first and second switches, said first switch supplies the DC electric power from said power line to said initial controller while said mechanical member is in the ON position, and stops supplying the DC electric power to said initial controller during said mechanical member is in the OFF position, said second switch enables said first driver and said second driver while said mechanical member is in the ON position, and disables said first driver and said second driver while said mechanical member is in the OFF position.

3. The electronic apparatus as claimed in claim 1, which is connected to an adapter that converts an AC electric power into a DC electric power, and wherein said power line is supplied with the DC electric power from said adapter outside said electronic apparatus.

4. A system comprising:

a plurality of electronic apparatus recited in claim 3, said plurality of electronic apparatus being connected to the respective adapters;

and a single power strip which supplies AC electric power to the adapters connected to the plurality of electronic apparatus, said power strip including a power supply switch which collectively supplies the AC electric power to the adapters while said power supply switch is in an ON state, and collectively stops supplying the AC electric power to the adapters while said power supply switch is in an OFF state.

* * * * *